United States Patent [19]

Wright

[11] Patent Number: 4,555,766
[45] Date of Patent: Nov. 26, 1985

[54] BRAKE CONTROL SYSTEM FOR VEHICLES
[75] Inventor: Eric Wright, Watertown, N.Y.
[73] Assignee: General Signal Corporation, Stamford, Conn.
[21] Appl. No.: 310,187
[22] Filed: Oct. 9, 1981
[51] Int. Cl.[4] .............................................. F15B 9/03
[52] U.S. Cl. .................................... 364/426; 137/85; 137/625.69; 303/95; 251/129.03
[58] Field of Search .................. 364/426, 424; 303/95, 303/96, 103, 110, 114, 117, 119, 20, 15, 17; 188/70 R, 71.1; 251/130, 133, 136, 149.1; 137/85, 625.68, 625.69, 625.64, 625.66

[56] References Cited

U.S. PATENT DOCUMENTS

| | | | |
|---|---|---|---|
| 3,482,588 | 12/1969 | Kreuter | 137/85 |
| 3,502,374 | 3/1970 | Billeter | 137/625.68 |
| 3,774,635 | 11/1973 | Farrell et al. | 137/625.68 |
| 3,977,438 | 8/1976 | Muchow et al. | 137/625.68 |
| 4,072,087 | 2/1978 | Mueller | 137/625.64 |
| 4,133,348 | 1/1979 | Spitz | 137/625.68 |
| 4,193,423 | 3/1980 | Stoll et al. | 137/625.66 |
| 4,260,198 | 4/1981 | Cook | 303/117 |
| 4,318,333 | 3/1982 | Cemenska | 137/625.68 |
| 4,363,999 | 12/1982 | Preikschat | 364/426 |

Primary Examiner—Errol A. Krass
Assistant Examiner—Thomas G. Black
Attorney, Agent, or Firm—Thomas R. FitzGerald; Jeffrey S. Mednick; Harold S. Wynn

[57] ABSTRACT

A microprocessor having input fluid brake control apparatus and output fluid brake application apparatus is provided wherein the output fluid brake application apparatus comprises a digital signal characteristic of a desired fluid braking pressure. The brake application apparatus comprises an improved fluid pressure regulator having a fluid pressure chamber for developing and maintaining a regulated braking fluid pressure. The improved regulator has valves selectively operable to brake application, release, and lap positions for selectively governing regulated fluid pressure in a braking device and in the fluid pressure chamber. A digital linear actuator having an axially operable shaft responsive to the digital signal is provided to actuate the valves alternately to application and release positions, the actuator being secured to a piston subject to pressure in the fluid pressure chamber on one side thereof and subject to pressure of a metering spring on the other side thereof. The valves are governed by a spool that is linearly actuated by the actuator.

3 Claims, 3 Drawing Figures

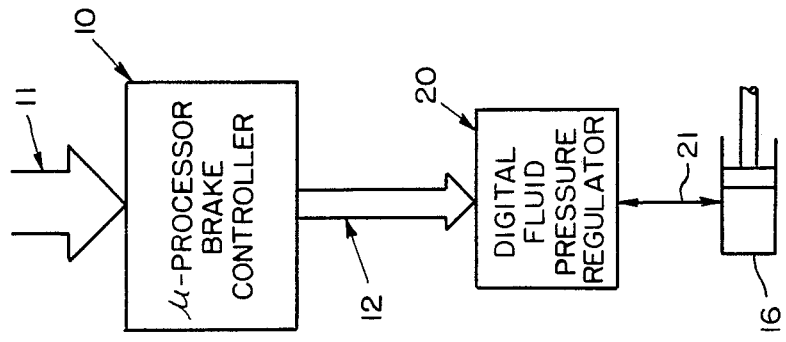
FIG. 2
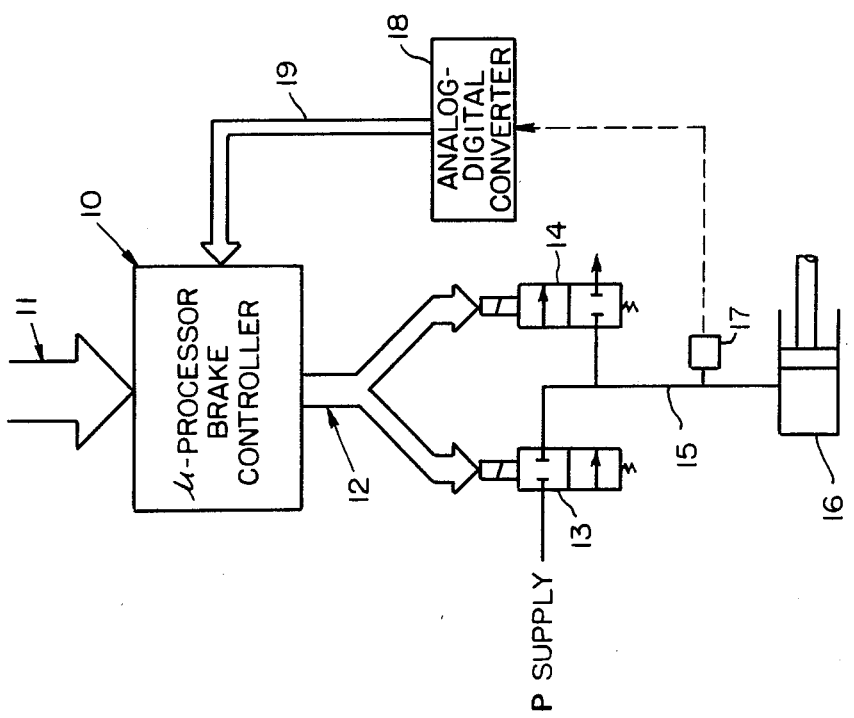
PRIOR ART FIG. 1

BRAKE CONTROL SYSTEM FOR VEHICLES

REFERENCE TO PRIOR CASES

This invention is related to prior U.S. applications which have resulted in U.S. Pat. Nos. 4,402,047 and 4,347,569 assigned to the same assignee as the present invention for microprocessor brake control systems. These applications when issued as patents, are in part incorporated herein by reference for defining background material for the present invention.

BACKGROUND OF THE INVENTION

This invention relates to brake control systems for vehicles, and, while the invention is subject to a wide range of applications, a preferred embodiment of the invention will be particularly described as applied to a braking system having its braking pressure regulated by a digital pressure regulator.

The present invention can be particularly useful in fluid braking systems, for example, such as in the system disclosed in the U.S. application of Ronald O. Newton, et al Ser. No. 216,976, filed Dec. 16, 1980, which issued as U.S. Pat. No. 4,402,047, granted Aug. 30, 1983 assigned to the same assignee as the present invention. This application discloses a computerized brake control system having a microprocessor brake controller for delivering digital commands to selectively actuate application and release solenoids respectively for governing application of fluid pressure to a braking cylinder. The microprocessor senses the brake cylinder pressure, and thereby determines when to lap the solenoids. This involves the use of costly solenoids, a pressure transducer, and feedback circuits to the microprocessor.

An object of the present invention is to provide an improved brake control system which substantially obviates one or more of the limitations and disadvantages of the described prior art systems.

Another object of the present invention is to provide a less costly pressure regulated brake control system.

Other objects, purposes and characteristic features of the present invention will be in part obvious from the accompanying drawings, and in part pointed out as the description of the invention progresses.

SUMMARY OF THE INVENTION

A brake control system for vehicles is provided comprising fluid brakes, a microprocessor having input fluid brake control apparatus, and output fluid brake application apparatus, the output fluid brake application apparatus comprising a digital signal characteristic of desired fluid braking pressure for governing operation of improved fluid pressure regulating apparatus, comprising a fluid pressure chamber for developing and maintaining a regulated braking fluid pressure, valves selectively operable to brake application, release, and lap positions for selectively governing fluid pressure in the brake and in the fluid pressure chamber. A digital linear actuator is responsive to digital signal outputs of the microprocessor for selectively actuating the valves to apply fluid pressure to the brakes corresponding to the digital signal governing the actuator.

IN THE DRAWINGS

FIG. 1 illustrates diagrammatically a prior art microprocessor brake control system;

FIG. 2 illustrates diagrammatically an improved microprocessor brake control system according to a preferred embodiment of the present invention.

Figure 3:
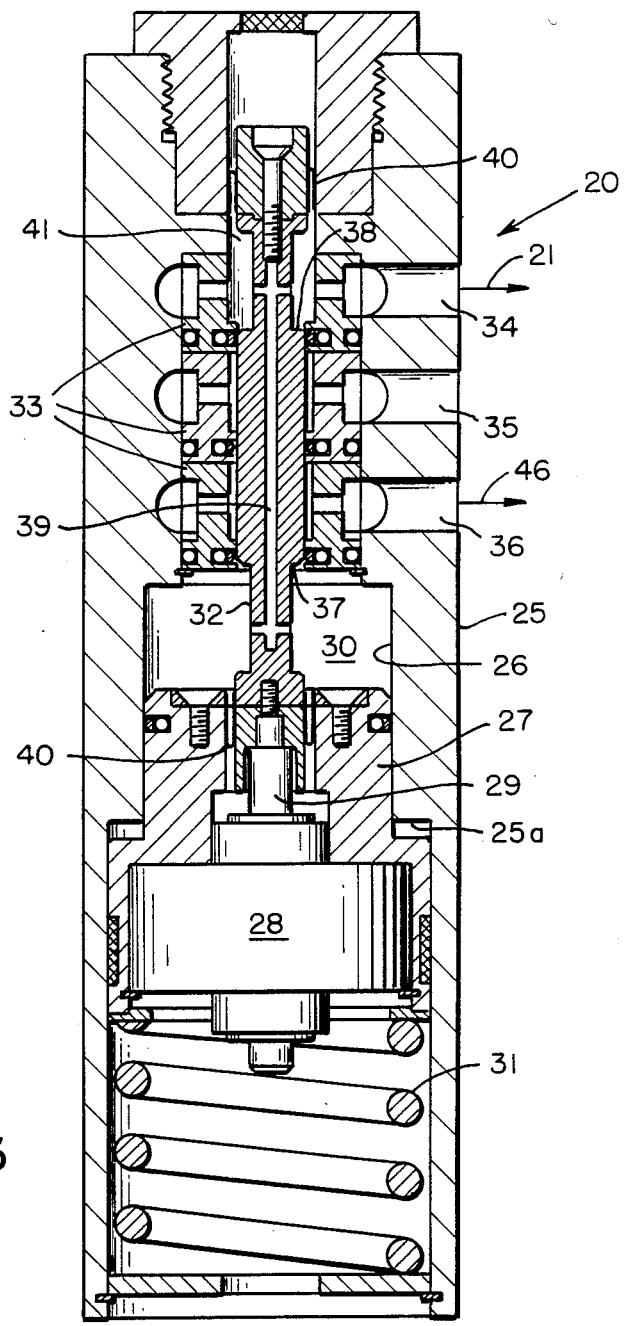
FIG. 3 is an elevational view, partly in cross-section, of a fluid pressure regulator shown diagrammatically in FIG. 2.

With reference to FIG. 1, a prior art brake control system is illustrated having a microprocessor brake controller 10 for processing brake control inputs 11 and selectively applying outputs 12 to an application solenoid 13 or a release solenoid 14. The energization of application solenoid 13 connects a suitable fluid power supply over a passage 15 to a brake cylinder 16 for application of the vehicle brakes. The pressure of the brake cylinder 16 is sensed by a pressure transducer 17, which generates an analog signal indicative of the braking pressure which is applied through an analog-to-digital converter 18 as a feedback signal 19 to the microprocessor for lapping the application valve 13 when the desired braking pressure is developed in the brake cylinder 16.

When a release control is applied at the input 11 to the microprocessor 10, the release solenoid 14 is energized to vent the fluid pressure through passage 15 from the brake cylinder 16. The extent of the pressure reduction is sensed by the pressure transducer 17 and delivered over the feedback 19 to the microprocessor to sense when the desired extent of the release has been accomplished.

With reference to FIG. 2, the system according to the present invention employs a microprocessor brake controller 10 the same as in the prior art having input brake controls 11 wherein the output 12 is a digital brake control signal for governing a digital pressure regulator 20 to in turn supply the desired brake control over passage 21 to brake cylinder 16.

With reference to FIG. 3, the digital pressure regulator 20 has a housing 25 having a stepped bore 26 containing a stepped piston 27 carrying a stepping motor 28 having an axially operable shaft 29.

A regulated fluid pressure chamber 30 can cause downward movement of the piston 27 by its increased fluid pressure against the bias of a metering spring 31.

A valve spool 32 is secured to the stepping motor shaft 29 so as to be axially operated thereby, the spool 32 extending through valve sleeves 33 having associated output, exhaust, and supply ports 34, 35 and 36 respectively. Lands 37 and 38 on the spool 32 are used to govern the supply of fluid to the chamber 30, and the exhaust of fluid from that chamber respectively, the chamber 30 being connected at all times to the output port 34 through an internal passage 39 in spool 32. The opposite ends of spool 32 are illustrated as being sealed by folding diaphragms 40 to permit free axial movement of the spool 32. A chamber 41 associated with the upper end of spool 32 faciliates a balance of pressure acting in opposite directions on the lands 37 and 38 of the spool 32.

In operation, with reference to FIGS. 2 and 3, various brake control inputs are applied at 11 to the microprocessor brake controller 10 and processed to provide a digital brake command output 12 that can be, for example, in the form of successive stepping pulses for actuation of the stepping motor 28, the pulses of one polarity being effective to actuate the linear output shaft 29 of the stepping motor 28 upwardly, for causing brake application. If the digital pulses are successively applied of the opposite polarity, the stepping motor 28 actuates its shaft 29 downwardly for reducing fluid pressure in the brake mechanism 16.

More specifically, with reference to FIG. 3, the calibrating spring 31 biases the piston 27 against a shoulder 25a of the housing 25, at which time the valve spool 32 can be adjusted axially by stepping pulse control output of the microprocessor 10 so that the output port 34, which is connected over passage 21 to the brake cylinder 16, is connected to the exhaust port 35 to vent fluid from the brake cylinder 16.

When braking is desired, stepping pulses are applied to the stepping motor 28 to actuate its shaft 29 and the spool 32 upwardly to close connection between the exhaust port 35 and the output port 34, past the land 38, and to close connection of a supply passage 46 through port 36, past land 37 of the spool 32 to the pressure chamber 30 above the piston 27. This pressure delivers fluid through the axial passage 39 of spool 32 over passage 21 to the brake cylinder 16 to pressurize the brake cylinder, and it also applies a pressure in chamber 30 to oppose the calibrating spring 31, and to move the piston 27 and the spool 32 downwardly to lap the braking pressure at a point corresponding to the number of pulses that have been successively applied to the stepping motor 28. This being accomplished, the braking pressure applied to the brake cylinder 16 is in accordance with the stepping signal output 12 of the microprocessor 10. The output passage 21 remains connected to the pressure chamber 30 through axial passage 39 of the spool 32 so that any leakage in pressure in the brake cylinder will cause the spool 32 to move upwardly and replenish the pressure by opening connection of the supply line 46 to the passage 30 past land 37 of spool 32.

If it is desired to reduce the braking pressure, stepping pulses of the opposite polarity are successively applied to stepping motor 28 by the microprocesser 10 to actuate the valve spool 32 downwardly to open the connection between output port 32 and the exhaust port 35, past the land 38 on spool 32. The extent of reduction in brake cylinder pressure in this manner, is of course dependent upon the extent of linear operation of shaft 29 of the stepping motor 28 by the microprocessor 10. If it is desired to release the brakes entirely, however, this is accomplished by applying sufficient successive pulses of the opposite polarity to the stepping motor to prevent the lapping of the connection of output port 34 to the exhaust port 35.

Having thus described a brake control system having its braking pressure regulated by a digital pressure regulator as a preferred embodiment of the present invention, it is to be understood that various modifications and alterations may be made to the specific embodiment shown without departing from the spirit or scope of the present invention.

What is claimed is:

1. A brake control system for vehicles comprising fluid braking means, a microprocessor having input brake control means and output fluid brake application means, the output fluid brake application means comprising means responsive to a digital signal characteristic of a desired fluid braking pressure, wherein the brake application means comprises improved fluid pressure regulating means comprising;
   (a) fluid pressure chamber means for developing and maintaining a regulated braking fluid pressure,
   (b) valve means having a spool selectively operable axially to select brake application, release and lap positions for selectively governing fluid pressure in the braking means and in the fluid pressure chamber,
   (c) digital linear actuating means comprising a stepping motor having axially operable shaft means coaxially connected to one end of the spool of the valve means and responsive to the digital signal to actuate the spool axially alternately to application and release brake control positions,
   (d) control means including the valve means and a piston carrying the stepping motor operable responsive to changes of fluid pressure in the chamber for maintaining output pressure to the fluid braking means in accordance with the characteristics of the digital signal, and
   (e) the piston being biased by a metering spring to permit expansion of the pressure chamber volume in accordance with an increase of fluid pressure within the fluid pressure chamber corresponding to the output pressure.

2. A brake control system according to claim 1 wherein the valve means has fluid pressure input, output and exhaust ports respectively cooperating with lands on the spool for governing pressurization of the braking means and the fluid pressure chamber.

3. A brake control system according to claim 2 wherein the spool is subject to actuation by the shaft means of the digital actuator whereby the actuation of the spool axially in one direction delivers supply fluid to the pressure chamber means and the braking means and actuation of the spool axially in the opposite direction exhausts fluid from the pressure chamber means and the braking means.

* * * * *